United States Patent Office
3,639,608
Patented Feb. 1, 1972

3,639,608
METHOD OF KILLING FUNGUS ON PLANTS
Bobby F. Adams, Pasadena, Tex., and William J. Pyne and James M. Gullo, Painesville, Ohio, assignors to Diamond Shamrock Corporation, Cleveland, Ohio
No Drawing. Original application June 1, 1967, Ser. No. 642,708. Divided and this application Jan. 19, 1970, Ser. No. 8,151
Int. Cl. A01n 9/22
U.S. Cl. 424—274
1 Claim

ABSTRACT OF THE DISCLOSURE

Pyrrolidinyl carboxanilides and pyrrolidinyl thiocarboxanilides are disclosed along with their preparation, e.g., from unsubstituted or ring substituted phenylisocyanates and phenylisothiocyanates reacted with unsubstituted or alkyl substituted pyrrolidines. The compounds have biological activity and especially herbicidal activity.

CROSS REFERENCES TO RELATED APPLICATIONS

This application is a divisional application of Ser. No. 642,708, Bobby F. Adams, William J. Pyne and James M. Gullo, filed June 1, 1967, now abandoned.

BACKGROUND OF THE INVENTION

This invention relates to the art of pyrrolidinyl carboxanilides and pyrrolidinyl thiocarboxanilides, both of which can be alkyl substituted and unsubstituted on the heterocyclic pyrrolidinyl ring as well as substituted or unsubstituted on the carbocyclic portion of these compounds. These compounds are more specifically detailed hereinbelow.

Heretofore it has been known that substituted ureas having one or more aliphatic radicals, e.g., methyl or ethyl radicals, substituted on the nitrogens bonded to the carbonyl carbon atom, exhibit herbicidal activity. For example, such compounds as N,N-dimethyl-N'-(3,4-dichlorophenyl)-alpha-chloroformamidine, have been disclosed in U.S. Pat. 3,084,192. It has now been found that the compounds to which this invention relates exhibit biological activity, and particularly herbicidal activity.

SUMMARY OF THE INVENTION

Broadly the biologically active compounds of this invention can be represented by the structure:

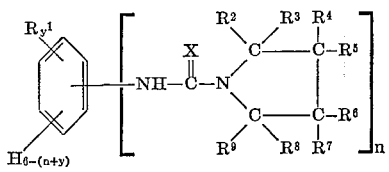

wherein $n$ is an integer selected from 1 and 2 inclusive, $y$ is selected from the group consisting of 0, 1, 2, and 3; $R^1$ is selected from the group consisting of alkyl, chlorine, fluorine, bromine, nitro, haloalkyl, cyano, alkoxy and combinations thereof; and, when $y$ is 2 or 3, $R^1$ may be the same or different;
$R^2$ through $R^9$ inclusive is a member selected from the group consisting of hydrogen and lower alkyl;
X is a member of the group consisting of oxygen and sulfur;
with the provision that when $n$ is 1, X is oxygen, and each of $R^2$ through $R^9$ inclusive are hydrogen, $R^1$ is other than bromine.

An especially preferred group of pyrrolidinyl carboxanilides and pyrrolidinyl thiocarboxanilides which exhibit outstanding herbicidal properties are represented by the structure:

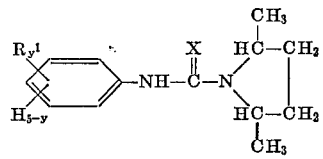

wherein X, $y$, and $R^1$ are as defined above.
The novel compounds within the scope of this invention are compounds represented by the following formula:

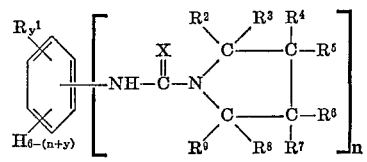

wherein $n$, $y$, X and $R^1$ are as defined above; and with the provision that when $n$ is 1 and each of $R^2$ through $R^9$ inclusive are hydrogen; and (A) X is oxygen, $R^1$ is other than bromine; or
(B) X is sulfur, $R^1$ is at least one group other than hydrogen, alkyl, and nitro.

The novel compounds of this invention can be prepared by chemically reacting unsubstituted or appropriately substitued phenylisocyanate or phenylisothiocyanate of the structure:

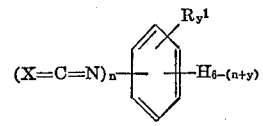

with a compound represented by the structure:

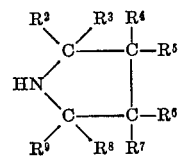

wherein for such structures the various groups and subscripts are defined as above.
Equation 1 specifically illustrates this process by showing the formation of 1-(2,5-dimethylpyrrolidinyl)-3'-trifluoromethylthiocarboxanilide by the chemical reaction of 2,5-dimethylpyrrolidine with 3-trifluoromethylphenylisothiocyanate.
(1)

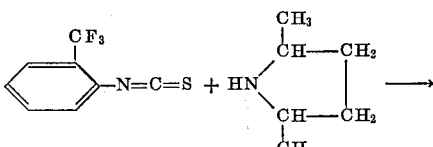

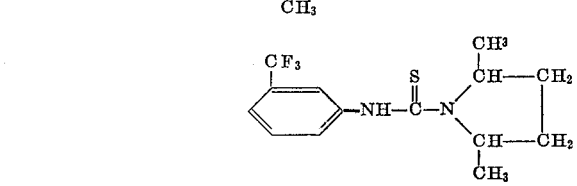

DESCRIPTION OF THE PREFERRED EMBODIMENTS

In preparing the compounds of this invention in accordance with the above disclosed methods, typically only about one mole of unsubstituted or alkyl substituted pyrrolidine is used per mole of reactive —N=C=O or —N=C=S groups contained on the carbocyclic ring of the unsubstituted or appropriately substituted phenylisocyanates or phenylisothiocyanates, although a slight excess can be employed to enhance completion of the reaction.

By the use of the term "alkyl substituted pyrrolidine" is meant pyrrolidine having one or more alkyl substituents on one or more of the carbon atoms on the pyrrolidine ring, with each alkyl substitution having from one to about six carbon atoms. The "appropriately substituted" phenylisocyanates, phenylisothiocyanates, phenyldiisocyanates, and phenyldiisothiocyanates, are those containing alkyl, halogen, nitro, haloalkyl, alkoxy, and cyano substituents as well as combinations of such substituents, with the alkyl substituents typically being each lower alkyl of about six or less carbon atoms.

Typically, for economy, and for safety when nitro substituents are present, not more than three substituents are present on the ring portion of the appropriately substituted compounds. The halogen substituents include chlorine, fluorine, and bromine and thus the haloalkyl groups are generally halo-substituted lower alkyl radicals of six or less carbon atoms containing chlorine, fluorine, or bromine substitution.

Preparation of the compounds as disclosed hereinbefore can be obtained simply by combining the reactants at room temperature, i.e., about 20–25° C. Advantageously, however, to enhance heat transfer during the early, typically exothermic, portion of the reaction, and for any subsequent heating prior to termination of the reaction, these reactants are contained in a liquid reaction medium which is preferably benzene for efficiency and economy. Other suitable substances for providing a liquid reaction medium include ethyl ether, carbon tetrachloride, and petroleum solvents. Additionally, it is advantageous to hasten completion of the reaction by maintaining the reaction medium within a temperature range from about 50° C. to about 100° C. for a time of between about one-quarter hour and about five hours.

After reaction, the resulting product can be readily obtained, e.g., simply by distillation to remove the liquid dispersant, preferably at reduced pressure for efficiency. When a solid product is obtained, it can be recrystallized, for example, from a mixture of benzene and n-heptane, to augment the product purity.

An alternative preparation for compounds of this invention which otherwise can be prepared from reactive —N=C=O groups, involves the reaction of an unsubstituted or appropriately substituted aromatic amine, containing one or two —NH$_2$ groups on the carbocyclic ring, with an unsubstituted or alkyl substituted (typically six carbon atoms or less per each alkyl substituent) pyrrolidinocarbonyl chloride. The appropriate substitutions for the aromatic amines are the same as described hereinbefore for the substituted phenylisocyanates and the like.

The desired pyrrolidinocarbonyl chloride can be prepared by reacting unsubstituted or alkyl substituted pyrrolidine with phosgene, with such reaction being carried out in suitable liquid dispersant such as benzene. The appropriate pyrrolidinocarbonyl chloride or the like and aromatic amine are reacted in the presence of a basic material, for example, sodium carbonate, sodium hydroxide, pyridine, and triethylamine, to enhance product formation through neutralization of by-product hydrogen chloride.

In using the compounds of this invention as pesticides, i.e., for the killing and/or controlling of, for example, one or more insects, fungi, bacteria, plants, nematodes, and viruses, they can be applied as such or they can be extended with a liquid or solid diluent. The compounds of this invention can, for example be combined or formulated into suitable compositions for spraying or drenching or, if desired, formulated as an emulsifiable concentrate. Alternatively, the compounds can, of course, be formulated into appropriate use compositions by mixing a toxic amount thereof with a conditioning agent of the kind used and referred to in the art of pest control as an adjuvant.

Pesticidal compositions embodying the invention can be prepared in the form of solids or liquids. Solid compositions, preferably in the form of wettable powders, are compounded to give homogeneous free-flowing powders by mixing the active ingredient with finely divided solids, Attaclays, diatomaceous earth, synthetic fine silica or flours such as walnut shell, redwood, soybean, cotton seed flour or other solid conditioning agents or carriers of the kind conventionally employed in preparing pest control compositions in solid or liquid form.

Even more preferable among solid compositions, in some instances, are granules or pellets when the application is primarily to the soil. Granules may be prepared by impregnating granular diluents such as granular Attaclay or may be made by first extending powdered solid with powdered diluent and subsequently granulating. Pellets may be made by extruding moistened, powdered mixtures under high pressure through dies or in accordance with the teachings of U.S. Pats. 3,056,723 and 3,168,437.

Liquid compositions of the invention can be prepared by mixing the active ingredient with a suitable liquid diluent medium. The resulting composition can be in the form of either a solution of suspension of the active ingredient.

The pesticidal composition of the invention, whether in the form of solids or liquids, for most applications may also include a surface-active agent of the kind sometimes referred to in the art as a wetting, dispersing or emulsifying agent. These agents, which will be referred to hereinafter more simply as surface-active agents, cause the compositions to be easily dispersed in water to give aqueous sprays.

The surface-active agents employed can be of the anionic, cationic, or nonionic type and include, for example, sodium and potassium oleate, the amine salts of oleic acids, such as morpholine and dimethylamine oleates, the sulfonated animal and vegetable oils such as sulfonated fish and castor oils, sulfonated petroleum oils, sulfonated acyclic hydrocarbons, sodium salt of lignin sulfonic acid (goulac), alkyl naphthalene sodium sulfonate and other wetting, dispersing and emulsifying agents such as those listed in articles by McCutcheon in "Soap and Chemical Specialties," vol. 31, Nos. 7–10 (1955) including, for example, the material known as Triton X–155 (100% alkylaryl polyether alcohol U.S. Pat. No. 2,504,064).

Generally, the surface-active agent will not comprise more than about 5% to 15% by weight of the composition, depending upon the particular surface-active agent, the system in which it is placed, and the result desired; in certain compositions, the percentage will be 1% or less. Usually, the minimum lower concentration will be 0.1%.

The active compound is, of course, applied in an amount sufficient to exert the desired pesticidal action. The amount of the active ingredient present in the compositions as actually applied will vary with the manner of application, the particular pest for which control is sought, the purposes for which the application is being made, and like variables. In general, however, the pesticidal compositions will contain from about 0.5% to 99% by weight of the active ingredient.

Fertilizer materials, herbicidal agents, and other pest control agents such as insecticides, bactericides, nematocides and fungicides can be included in the compositions of the invention if desired.

In order that those skilled in the art may more completely understand the present invention and the preferred methods by which the same may be carried into effect, the following specific examples are offered:

EXAMPLE 1

Part A.—Preparation of 1-(2,5-dimethylpyrrolidinyl)-3,4-dichlorocarboxanilide A 10-gram portion (0.053 mole) of 3,4-dichlorophenylisocyanate is reacted with 5.3 grams (0.053 mole) of 2,5-dimethylpyrrolidine in 100 mls. of dry benzene. The mixture is heated on a hot water bath for 30 minutes, cooled, filtered and the solvent distilled at reduced pressure. The residual solid is recrystallized from a mixture of benzene and n-pentane to give 12 grams (78%) yield of a solid melting at 137–138° C.

Part B

The compound 1 - (2,5 - dimethylpyrrolidinyl)-carboxanilide, some exemplary substituted derivatives of same, and the compound 1 - (2,5 - dimethylpyrrolidinyl)-thiocarboxanilide along with some exemplary substituted derivatives thereof, are prepared by reacting 2,5-dimethylpyrrolidine, in accordance with the Part A method, using either substituted or unsubstituted phenylisocyanate, or substituted or unsubstituted phenylisothiocyanate. In Table 1 below, each of such exemplary isocyanates and isothiocyanates employed is shown under the table heading "Reactant A"; also, some characteristics of the resulting products are set forth.

EXAMPLE 2

Part A.—Preparation of 1-pyrrolidinyl-2',5'-dichlorocarboxanilide

A 7.1 gram (0.1 mole) portion of pyrrolidine is dissolved in 100 mls. of dry benzene. Into this solution is added 18.8 grams (0.1 mole) of 2,5-dichlorophenylisocyanate dissolved in 50 mls. of benzene. After a slight exothermic reaction, the mixture is heated to reflux for 3 hours. The solvent is distilled at reduced pressure and the residual solid is recrystallized from a mixture of benzene and n-heptane to give 23 grams (88% yield) of a solid melting at 116–117° C.

Part B

The compound 1-pyrrolidinylcarboxanilide, some exemplary substituted derivatives thereof, as well as the compound 1-pyrrolidinylthiocarboxanilide, are prepared by reacting pyrrolidine, in accordance with the Part A process, either with phenylisothiocyanate or phenylisocyanate, or exemplary substituted derivatives of them. In Part 1 of Table 2 below, the exemplary isocyanates are listed under the "Reactant B" column, and along with some characteristics of the resulting reaction products.

The substituted pyrrolidinylcarboxanilides, dealt with in Part 2 of Table 2 are prepared by reacting pyrrolidine with the respective phenyldiisocyanate, shown in Part 2 of the table as "Reactant B'," in accordance with the above process, except that two molar amounts of pyrrolidine are used per one molar amount of phenyldiisocyanate.

TABLE 1

| | | | | | Nitrogen analysis, percent | |
|---|---|---|---|---|---|---|
| Reactant A | Product | Empirical formula | Yield, wt. percent | M.P., °C. | Calculated | Actual |
| 3-methylphenylisocyanate | 1-(2,5-dimethylpyrrolidinyl)-3'-methylcarboxanilide | $C_{14}H_{20}N_2O$ | 76 | 73–75 | 12.1 | 12.7 |
| 4-chlorophenylisocyanate | 1-(2,5-dimethylpyrrolidinyl)-4'-chlorocarboxanilide | $C_{13}H_{17}Cl_1N_2O$ | 84 | 148–149 | 11.1 | 10.9 |
| 3-chlorophenylisocyanate | 1-(2,5-dimethylpyrrolidinyl)-3'-chlorocarboxanilide | $C_{13}H_{17}Cl_1N_2O$ | 81 | 118–119 | 11.1 | 11.4 |
| 4-methoxyphenylisocyanate | 1-(2,5-dimethylpyrrolodinyl)-4'-methoxycarboxanilide | $C_{14}H_{20}N_2O_2$ | 80 | 110–112 | 12.1 | 11.3 |
| 2-methoxyphenylisocyanate | 1-(2,5-dimethylpyrrolidinyl)2'-methoxycarboxanilide | $C_{14}H_{20}N_2O_2$ | 56 | 68–69 | 11.3 | 12.1 |
| 2,5-dichlorophenylisocyanate | 1-(2,5-dimethylpyrrolidinyl)-2'-5'-dichlorocarboxanilide | $C_{13}H_{16}Cl_2N_2O$ | 42 | 54–55 | 9.7 | 9.8 |
| 3-methoxyphenylisocyanate | 1-(2,5-dimethylpyrrolidinyl)-3'-methoxycarboxanilide | $C_{14}H_{20}N_2O_2$ | 61 | 104–106 | 11.3 | 11.3 |
| Phenylisocyanate | 1-(2,5-dimethylpyrrolidinyl)-carboxanilide | $C_{13}H_{18}N_2O$ | 65 | 109–110 | 12.8 | 13.2 |
| Phenylisothiocyanate | 1-(2,5-dimethylpyrrolidinyl)-thiocarboxanilide | $C_{13}H_{18}N_2S$ | 60 | 104–105 | 11.95 | 12.1 |
| 2-methylphenylisocyanate | 1-(2-5,dimethylpyrrolidinyl)-2'-methylcarboxanilide | $C_{14}H_{20}N_2O$ | 86 | 105 | 12.1 | 11.6 |
| 4-cyanophenylisocyanate | 1-(2,5-dimethylpyrrolidinyl)-4'-cyanocarboxanilide | $C_{14}H_{17}N_3O$ | 41 | 160–161 | 17.3 | 17.1 |
| 2-ethoxyphenylisocyanate | 1-(2,5-dimethylpyrrolidinyl)-2'-ethoxycarboxanilide | $C_{15}H_{22}N_2O_2$ | 76 | ---------- | 10.7 | 10.7 |
| 4-fluorophenylisocyanate | 1-(2,5-dimethylpyrrolidinyl)-4'-fluorocarboxanilide | $C_{13}H_{17}F_1N_2O$ | 75 | 135 | 11.85 | 11.5 |
| 3-trifluoromethylphenylisothiocyanate | 1-(2,5-dimethylpyrrolidinyl)-3'-trifluoromethyl-thiocarboxanilide | $C_{14}H_{17}F_3N_2S$ | 80 | 120–121 | 9.5 | 9.3 |
| 4-nitrophenylisocyanate | 1-(2,5-dimethylpyrrolidinyl)-4'-nitrocarboxanilide | $C_{13}H_{17}N_3O_3$ | 98 | 114–116 | 16.0 | 16.3 |
| 4-bromophenylisocyanate | 1-(2,5-dimethylpyrrolidinyl)-4'-bromocarboxanilide | $C_{13}H_{17}Br_1N_2O$ | 88 | 131–132 | 9.4 | 9.2 |
| 3-trifluoromethylphenylisocyanate | 1-(2,5-dimethylpyrrolidinyl)-3'-trifluoromethyl-carboxanilide | $C_{14}H_{17}F_3N_2O$ | 85 | 129–130 | 9.8 | 10.0 |
| 2-chlorophenylisocyanate | 1-(2,5-dimethylpyrrolidinyl)-2'-chlorocarboxanilide | $C_{14}H_{17}Cl_1N_2O$ | 93 | Oil | 11.1 | 10.4 |
| 3-nitrophenylisocyanate | 1-((2,5-dimethylpyrrolidinyl)-3'-nitrocarboxanilide | $C_{13}H_{17}N_3O_3$ | 84 | 130–131 | 16.0 | 16.1 |
| 3,4-dichlorophenylisocyanate | 1-(2,5-dimethylpyrrolidinyl)-3,4-dichlorocarboxanalide | $C_{13}H_{16}Cl_2N_2O$ | 78 | 137–138 | 9.7 | 9.7 |

TABLE 2.—PART 1

| | | | | | Characteristics for product obtained by reacting pyrrolidine with Reactant B in Part 1 | | | | |
|---|---|---|---|---|---|---|---|---|---|
| | | | | | | | Elemental analysis, percent | | |
| | | | | | | | Calculated | | Actual |
| Reactant B | Product | Empirical formula | Yield, wt. percent | M.P., °C. | | | C | H | C | H |
| Phenylisocyanate | 1-pyrrolidinylcarboxanilide | $C_{11}H_{14}N_2O$ | 91 | 130–1 | | | 69.4 | 7.4 | 69.3 | 7.3 |
| Phenylisothiocyanate | 1-pyrrolidinylthiocarboxanilide | $C_{11}H_{14}N_2S$ | 93 | 149–150 | | | 64.0 | 6.85 | 64.3 | 7.0 |
| 3-chlorophenylisocyanate | 1-pyrrolidinyl-3'-chlorocarboxanilide | $C_{11}H_{13}Cl_1N_2O$ | 91 | 143–144 | | | 58.8 | 5.8 | 58.8 | 5.9 |
| 3,4-dichlorophenylisocyanate | 1-pyrrolidinyl-3',4'-dichlorocarboxanilide | $C_{11}H_{12}Cl_2N_2O$ | 78 | 179–180 | | | 51.0 | 4.7 | 51.0 | 4.9 |
| 2-methylphenylisocyanate | 1-pyrrolidinyl-2'-methylcarboxanilide | $C_{12}H_{16}N_2O$ | 89 | 98–99 | | | 70.6 | 7.9 | 69.3 | 7.8 |
| 4-methylphenylisocyanate | 1-pyrrolidinyl-4'-methylcarboxanilide | $C_{12}H_{16}N_2O$ | 75 | 141–142 | | | 70.6 | 7.9 | 70.2 | 7.8 |
| 4-nitrophenylisocyanate | 1-pyrrolidinyl-4'-nitrocarboxanilide | $C_{11}H_{13}N_3O_3$ | 100 | 139–141 | | | 17.9 | | 18.0 | |
| 2-ethoxyphenylisocyanate | 1-pyrrolidinyl-2'-ethoxycarboxanilide | $C_{13}H_{18}N_2O_2$ | 65 | 74–75 | | | 11.9 | | 11.2 | |
| 4-chlorophenylisocyanate | 1-pyrrolidinyl-4'-chlorocarboxanilide | $C_{11}H_{13}Cl_1N_2O$ | 100 | 167–168 | | | 12.48 | | 12.3 | |
| 3-trifluoromethylphenylisocyanate | 1-pyrrolidinyl-3'-trifluoromethylcarboxanilide | $C_{12}H_{13}F_3N_2O$ | 67.4 | 160–161 | | | 10.8 | | 10.8 | |
| 2,5-dichlorophenylisocyanate | 1-pyrrolidinyl-2',5'-dichlorocarboxanilide | $C_{11}H_{12}Cl_2N_2O$ | 88 | 116–117 | | | 10.9 | | 11.1 | |
| 3-methylphenylisocyanate | 1-pyrrolidinyl-3'-methylcarboxanilide | $C_{12}H_{16}N_2O$ | 80 | 124–125 | | | 13.5 | | 13.5 | |
| 2-methoxyphenylisocyanate | 1-pyrrolidinyl-2'-methoxyxarboxanilide | $C_{12}H_{16}N_2O_2$ | 96 | 74–75 | | | 12.7 | | 13.1 | |
| 4-methoxyphenylisocyanate | 1-pyrrolidinyl4'-methoxycarboxanilide | $C_{12}H_{16}N_2O_2$ | 95 | 113–114 | | | 12.7 | | 13.1 | |
| 3-nitrophenylisocyanate | 1-pyrrolidinyl-3'-nitrocarboxanilide | $C_{11}H_{13}N_3O_3$ | 100 | 153–155 | | | 17.9 | | 18.1 | |
| 4-chloro-3-trifluoromethylphenylisocyanate | 1-pyrrolidinyl-4-chloro-3'-trifluoromethylcarboxanilide | $C_{12}H_{12}Cl_1F_3N_2$ | 51.7 | 132–133 | | | 9.6 | | 9.6 | |
| 3-methoxphenylisocyanate | 1-pyrrolidinyl-3'-methoxycarboxanilide | $C_{12}H_{16}N_2O_2$ | 57 | 157–158 | | | 12.7 | | 12.5 | |
| 2,4-dimethylphenylisocyanate | 1-pyrrolidinyl-2'4'-dimethylcarboxanilide | $C_{13}H_{18}N_2O$ | 13 | 126–128 | | | 12.8 | | 12.7 | |

TABLE 2.—PART 2

| | | | | | Characteristics for product obtained by reacting pyrrolidine with Reactant B' in Part 1 | | | | |
|---|---|---|---|---|---|---|---|---|---|
| | | | | | | | Elemental analysis, percent | | |
| | | | | | | | Calculated | | Actual |
| Reactant B' | Product | Empirical formula | Yield, wt. percent | M.P. °C. | | | C | H | C | H |
| Phenylene-1,3-diisocyanate | 1,3-bis(1'-pyrrolidinylformamide)-benzene | $C_{16}H_{22}N_4O_2$ | 92 | 193–195 | | | 63.5 | 7.3 | 62.9 | 7.3 |
| Phenylene-1,4-diisocyanate | 1,4-bis(1'-pyrrolidinylformamide)-benzene | $C_{16}H_{22}N_4O_2$ | 81 | 195 | | | 63.5 | 7.3 | 63.3 | 7.4 |

EXAMPLE 3

Part A.—Preparation of 1-[1-(2,2,5-trimethyl-4-isopropylpyrrolidinyl)]carboxanilide Part A–1.—Preparation of intermediate 2,5,5-trimethyl-3-isopropylidene-1-pyrroline A 200 gram portion of concentrated sulfuric acid is cooled to 0° C. To this solution is added 10.3 grams (0.25 mole) of freshly distilled acetonitrile. The temperature is allowed to rise to 10° C. and 36.4 grams (0.25 mole) of 2,5-dimethyl-2,5-hexanediol is added in small portions over a one-hour period. The mixture is then stirred for one hour at 10–15° C., poured over 400 grams of ice and the solution extracted with chloroform. The aqueous layer is made basic by the addition of 360 ml. of 30% sodium hydroxide, while keeping the temperature at 30° C. After the solution is made basic, the mixture is extracted with ethyl ether. The ether extracts are dried over anhydrous $K_2CO_3$, filtered and the solvent distilled at reduced pressure. The residual oil is vacuum distilled to give 26.4 grams, 70% yield, of a liquid distilling at 82–83° C. at a pressure of 15 mm. Hg and having an index of refraction ($n_D$) at 25° C. of 1.4480.

Part A–2.—Preparation of intermediate 2,2,5-trimethyl-4-isopropylpyrrolidine

The 26.4 gram (0.175 mole) resulting intermediate product from Part A–1 is dissolved in 60 ml. of acetic acid along with 0.3 g. of platinum oxide in a pressure bottle manufactured by the Parr Instrument Company. The mixture is then reduced on a Parr hydrogenation apparatus (Model No. 2501) until no more hydrogen is absorbed. The solution was filtered and the filtrate diluted with 200 ml. of water and made basic with 30% aqueous sodium hydroxide solution. The solution is extracted with ethyl ether and the ether extracts dried over $K_2CO_3$. The ether solvents are distilled at reduced pressure leaving 20.6 grams (75%) yield of a liquid. From this resulting liquid a final 11.8 g. (44%) yield of a liquid product is distilled at 62–63.5° C. at a pressure of 13 mm. Hg.

Part A–3.—Preparation of final product

A 2.54 g. (0.0214 mole) portion of phenylisocyanate is dissolved in 50 ml. of dry benzene along with 3.3 g. (0.0214 mole) of the final liquid product from Part A–2. After the exothermic reaction has subsided, the mixture is heated on a hot water bath for one hour. The solvent is distilled at reduced pressure and the residual solid recrystallized from a mixture of benzene and n-hexane to give 5 grams (86%) yield of a white solid, 1-[1-(2,2,5-trimethyl - 4 - isopropylpyrrolidinyl)]carboxanilide, melting at 145–146° C.

Part B

The resulting white solid thus prepared as well as exemplary substituted 1 - [1-(2,2,5-trimethyl-4-isopropylpyrrolidinyl)]carboxanilides are embraced in Table 3. These substituted compounds are prepared by reacting 2,2,5-trimethyl-4-isopropylpyrrolidine with the respective substituted phenylisocyanate, shown in the table as "Reactant C," in accordance with the above process.

TABLE 3

| Reactant C | Product | Empirical formula | Characteristics for product obtained by reacting 2,2,5-trimethyl-4-isopropyl pyrrolidine with reactant C | | | |
|---|---|---|---|---|---|---|
| | | | Yield, wt. percent | M.P., °C. | Nitrogen analysis, percent | |
| | | | | | Calculated | Actual |
| Phenylisocyanate | 1-[1-(2,2,5-trimethyl-4-isopropylpyrrolidinyl)] carboxanilide. | $C_{17}H_{26}N_2O$ | 86 | 145–146 | 10.2 | 10.4 |
| 4-chlorophenylisocyanate | 1-[1-(2,2,5-trimethyl-4-isopropylpyrrolidinyl)]-4'-chlorocarboxanilide. | $C_{17}H_{25}Cl_1N_2O$ | 90 | 164–165 | 9.07 | 9.0 |
| 3-chlorophenylisocyanate | 1-[1-(2,2,5-trimethyl-4-isopropylpyrrolidinyl)]-3'-chlorocarboxanilide. | $C_{17}H_{25}Cl_1N_2O$ | 90 | 109–110 | 9.07 | 8.9 |
| 2-nitrophenylisocyanate | 1-[1-(2,2,5-trimethyl-4-isopropylpyrrolidinyl)]-2'-nitrocarboxanilide. | $C_{17}H_{25}N_3O_3$ | 79 | Oil | 13.1 | 12.5 |
| 3-trifluorophenylisocyanate | 1-[1-(2,2,5-trimethyl-4-isopropylpyrrolidinyl)]-3'-trifluoromethylcarboxanilide. | $C_{18}H_{25}F_3N_2O$ | 93 | 134–135 | 8.11 | 8.0 |
| 3-methoxyphenylisocyanate | 1-[1-(2,2,5-trimethyl-4-isopropylpyrrolidinyl)]-3'-methoxycarboxanilide. | $C_{18}H_{28}N_2O_2$ | 63 | 110–111 | 9.19 | 8.9 |
| 3,4-dichlorophenylisocyanate | 1-[1-(2,2,5-trimethyl-4-isopropylpyrrolidinyl)]-3',4'-dichlorocarboxanilide. | $C_{17}H_{24}Cl_2N_2O$ | 88 | 140 | 8.16 | 8.2 |
| 3-nitrophenylisocyanate | 1-[1-(2,2,5-trimethyl-4-isopropylpyrrolidinyl)]-3'-nitrocarboxanilide. | $C_{17}H_{25}N_3O_3$ | 87 | 124–125 | 13.14 | 13.1 |
| 4-cyanophenylisocyanate | 1-[1-(2,2,5-trimethyl-4-isopropylpyrrolidinyl)]-4'-cyanocarboxanilide. | $C_{18}H_{25}N_3O$ | 74 | 174 | 14.0 | 14.0 |

EXAMPLE 4

Part A.—Preparation of 1-(2,4-dimethylpyrrolidinyl)-3'-chlorocarboxanilide

Part A–1.—Preparation of intermediate 2,4-dimethylpyrrolidine

A 62 g. (0.65 mole) quantity of 2,4-dimethylpyrrole is dissolved in 150 ml. of acetic acid along with 6.5 grams of 5% rhodium and powdered alumina. This mixture is placed in a Parr hydrogenation apparatus and reduced. The crude material is filtered and the filtrate made alkaline with 25% sodium hydroxide solution. The solution is extracted with ethyl ether, dried over anhydrous $K_2CO_3$ and filtered. The ether is distilled at reduced pressure and the residual oil vacuum distilled. The product, 39.2 grams (61%) yield, is distilled at 111–113.5° C.

Part A–2.—Preparation of final product

A 5.2 g. (0.053 mole) portion of the product prepared in Part A–1 is dissolved in 75 ml. of benzene. To this mixture is added 8.1 grams (0.053 mole) of m-chlorophenylisocyanate dissolved in 25 ml. of dry benzene. After the exothermic reaction has subsided, the mixture is heated on a hot water bath for one hour. The benzene solvent is distilled at reduced pressure. The residual oil is placed under a high vacuum to remove the last traces of solvent. There is isolated 12.4 g. (93%) yield of viscous oil having an elemental nitrogen analysis as shown in Table 4 below.

Table 4 sets forth data for the compound 1-[1-(2,4-dimethylpyrrolidinyl)]carboxanilide as well as for exemplary substituted derivatives thereof. These compounds are prepared by reacting 2,4 - dimethylpyrrolidine with phenylisocyanate or substituted phenylisocyanate which isocyanates are set forth in the table as Reactant D, in accordance with the above method.

EXAMPLE 5

Part A.—Preparation of 1-[1-(2,2-dimethyl-4-isopropyl-5-n-propylpyrrolidinyl)[carboxanilide Part A–1.—Preparation of intermediate 2,2-dimethyl-4-isopropylidine-5-n-propyl-1-pyrrolidine A 200 gram portion of concentrated sulfuric acid is cooled to 0° C. To this solution is added 20.7 grams (0.3 mole) of freshly distilled n-butyronitrile. The temperature is allowed to rise to 10° C. and 43.8 grams (0.3 mole) of 2,5-dimethyl-2,5-hexanediol is added in small portions over a one-hour period. The mixture is then stirred for one hour at 10–15° C., poured over 400 grams of ice and the solution extracted with chloroform. The aqueous layer is made basic by the addition of 400 mls. of 30% sodium hydroxide, while keeping the temperature at 30° C. After the solution is made basic, the mixture is extracted with ethyl ether. The ether extracts are dried over anhydrous $K_2CO_3$, filtered and the solvent distilled at reduced pressure. The residual oil is vacuum distilled to give 40.0 grams, 74.5% yield, of a liquid distilling at 82–83° C. at a pressure 6.0 mm. Hg.

Part A–2.—Preparation of intermediate 2,2-dimethyl 4-isopropyl-5-n-propylpyrrolidine The 40.0 g. (0.224 mole) Part A–1 resulting intermediate product is dissolved in 75 ml. of acetic acid along with 0.3 g. of platinum oxide in a pressure bottle manufactured by the Parr Instrument Company. The mixture is then reduced on a Parr hydrogenation apparatus (Model No. 2501) until no more hydrogen is absorbed. The solution was filtered and the filtrate diluted with 200 ml. of water and made basic with 30% aqueous sodium hydroxide solution. The solution is extracted with ethyl ether and the ether extracts dried over anhydrous $K_2CO_3$. The solvent is distilled at reduced pressure leaving 40.0 grams

TABLE 4

| Reactant D | Product | Empirical formula | Characteristics for product obtained by reacting 2,4-dimethylpyrrolidine with Reactant D | | | |
|---|---|---|---|---|---|---|
| | | | Yield, wt. percent | M.P., °C. | Nitrogen analysis, percent | |
| | | | | | Calculated | Actual |
| 3-chlorophenylisocyanate | 1-[1-(2,4-dimethylpyrrolidinyl)]-3'-chlorocarboxanilide. | $C_{13}H_{17}Cl_1N_2O$ | 93 | Oil | 11.09 | 11.0 |
| 4-chlorophenylisocyanate | 1-[1-(2,4-dimethylpyrrolidinyl)]-4'-chlorocarboxanilide. | $C_{13}H_{17}Cl_1N_2O$ | 95 | 139 | 11.09 | 11.4 |
| 4-bromophenylisocyanate | 1-[1-(2,4-dimethylpyrrolidinyl)]-4'-bromocarboxanilide. | $C_{13}H_{17}Br_1N_2O$ | 89 | 155 | 9.42 | 9.3 |
| Phenylisocyanate | 1-[1-(2,4-dimethylpyrrolidinyl)]carboxanilide | $C_{13}H_{18}N_2O$ | 85 | 113–114 | 12.8 | 13.0 |
| 4-fluorophenylisocyanate | 1-[1-(2,4-dimethylpyrrolidinyl)]-4'-fluorocarboxanilide | $C_{13}H_{17}F_1N_2O$ | 57 | 95–96 | 11.9 | 11.7 |
| 3,4-dichlorophenylisocyanate | 1-[1-(2,4-dimethylpyrrolidinyl)]-3',4'-dichlorocarboxanilide. | $C_{13}H_{16}Cl_2N_2O$ | 77 | 124–129 | 9.77 | 9.5 |

(97%) yield of a liquid. From this resulting liquid a final 34.0 gms. (83.3%) yield of liquid product is distilled at 84° C. at a pressure of 8.5 mm. Hg.

Part A-3.—Preparation of final product

A 4.5 g. (0.038 mole) portion of phenylisocyanate is dissolved in 60 mls. of dry benzene along with 6.9 g. (0.038 mole of the final liquid product from Part A-2. After the exothermic reaction was subsided, the mixture is heated on a hot water bath for one hour. The solvent is distilled at reduced pressure and the residual solid recrystallized from a mixture of benzene and n-hexane to give 10 grams (88% yield) of a white solid, 1-[1-(2,2-dimethyl-4-isopropyl-5-n - propylpyrrolidinyl)] carboxanilide, melting at 140–141° C.

Part B

The resulting white solid thus prepared as well as exemplary substituted 1-[1-(2,2-dimethyl-4-isopropyl-5-n-propylpyrrolidinyl)] carboxanilides are embraced in Table 5. These substituted compounds are prepared by reacting 2,2 - dimethyl-4-isopropyl-5-n-propylpyrrolidine with the respective substituted phenylisocyanate, shown in the table as "Reactant E," in accordance with the above process.

EXAMPLE 7

Mexican bean beetle leaf spray test

This test determines the insecticidal activity of the compound being tested against the Mexican bean beetle (*Epilachna varivestis*).

The test species is composed of one-day old larvae of the the Mexican bean beetle. Paired fully expanded primary leaves excised from Pinto bean plants are maintained in a suitable container and sprayed with 50 ml. of the test formulation in a turntable spray hood. This test formulation contains 0.1 g. chemical (or 0.1 ml. if a liquid), 4.0 ml. acetone, 2.0 ml. stock emulsifier solution (0.5% Triton X–155 in water by volume), and 94.0 ml. distilled water. The concentration of toxicant in this formulation is 1000 parts per million. Lower concentrations of toxicant are obtained by diluting the formulation with distilled water.

After the chemical deposit on the leaves is dry, the paired leaves are separated, and only one of the leaves, selected at random, is used for the test. This leaf is placed onto 1.5% water agar (15 ml. per 100 mm. polystyrene disposable petri dish), and is infested with 10 one-day old Mexican bean beetle larvae. These are held at 72° F. for three days when mortality and feeding inhibition are deter-

TABLE 5

| | | | Characteristics for product obtained by reacting 2,2-dimethyl-4-isopropyl-5-n-propylpyrrolidine with Reactant E | | | |
|---|---|---|---|---|---|---|
| | | | | | Nitrogen analysis, percent | |
| Reactant E | Product | Empirical formula | Yield, wt. percent | M.P., ° C. | Calculated | Actual |
| Phenylisocyanate | 1-[1-(2,2-dimethyl-4-isopropyl-5-n-propylpyrrolidinyl)] carboxanilide. | $C_{19}H_{30}H_2O$ | 88 | 140–141 | 9.26 | 9.6 |
| 4-chlorophenylisocyanate | 1-[1-(2,2-dimethyl-4-isopropyl-5-n-propylpyrrolidinyl)] 4'-chlorocarboxanilide. | $C_{19}H_{29}ClN_2O$ | 86 | 144 | 8.30 | 8.1 |
| 3-chlorophenylisocyanate | 1-[1-(2,2-dimethyl-4-isopropyl-5-n-propylpyrrolidinyl)]-3'-chlorocarboxanilide. | $C_{19}H_{29}ClN_2O$ | 92 | 138–139 | 8.30 | 7.9 |
| 3,4-dichlorophenylisocyanate | 1-[1-(2,2-dimethyl-4-isopropyl-5-n-propylpyrrodinyl)]-3',4'-dichlorocarboxanilide. | $C_{19}H_{29}Cl_2N_2O$ | 78 | 141–142 | 7.5 | 7.0 |
| o-tolylisocyanate | 1-[1-(2,2-dimethyl-4-isopropyl-5-n-propylpyrrolidinyl)]-2'-ethylcarboxanilide. | $C_{20}H_{32}N_2O$ | 88 | 129 | 8.8 | 8.8 |

EXAMPLE 6

Mexican bean beetle leaf dip test

This test determines the insecticidal activity of the compound being tested against the Mexican bean beetle *Epilachna varivestis*.

The test species is composed of fourth instar larvae, less than one day old within the instar. Paired fully expanded seed leaves excised from bean plants are dipped into the test formulation and agitated until they are thoroughly wetted. The test formulation contains the test compound, acetone, stock emulsifier solution and distilled water. The concentration of toxicant in this formulation is up to 2000 parts per million. Lower concentrations of toxicant are obtained by diluting the test formulation with distilled water. The chemical deposited on the leaves is then dried and the paired leaves are separated. One leaf is placed into each of two Dixie cups and up to 10 of the randomyl-selected larvae are counted into each Dixie cup which is then covered with a petri dish cover. These are held at 70° F. for three days, after which mortality is determined. Results of insecticidal activity are given in the following table.

| Compound tested | Concentration, p.p.m. | Percent mortality |
|---|---|---|
| 1-pyrrolidinyl-4'-methylcarboxanilide | 1,000 | 80. |
| 1-pyrrolidinyl-4'-chloro-3'trifluoromethyl-carboxanilide. | 32 | 100, In. |
| 1-(2,5-dimethylpyrrolidinyl)-4'-methoxy-carboxanilide. | 1,000 | 64, In. |
| 1-(2,5-dimethylpyrrolidinyl)-3',4'-dichloro-carboxanilide. | 1,000 | 100, In. |
| 1-(2,5-dimethylpyrrolidinyl)-2',5'-dichloro-carboxanilide. | 1,000 | 100, In. |

NOTE.—In= Greater than 50% feeding inhibition.

mined. The feeding inhibition is an indication of the repellent properties of the test material. Results of insecticidal activity are given in the following table:

| Compound tested | Concentration, p.p.m. | Percent mortality |
|---|---|---|
| 1-(2,5-dimethylpyrrolidinyl)-thiocarboxanilide | 1,000 | 100, In. |
| 1-(2,5-dimethylpyrrolidinyl)-2'-methyl-carboxanilide. | 1,000 | 100, In. |
| 1-(2,5-dimethylpyrrolidinyl)-4'-cyano-carboxanilide. | 1,000 | 100, In. |
| 1-(2,5-dimethylpyrrolidinyl)-4'-fluoro-carboxanilide. | 1,000 | 80. |
| 1-(2,5-dimethylpyrrolidinyl)-4'-nitro-carboxanilide. | 1,000 | 80, In. |
| | 500 | 80. |

NOTE.—In= Greater than 50% feeding inhibition.

EXAMPLE 8

Red-banded leaf roller leaf spray test

This test determines the insecticidal activity of the compound being tested against the red-banded leaf roller, *Argyrotacnia volutiana*.

The test species is composed of newly hatched larvae of the red-banded leaf roller. Paired fully expanded primary leaves excised from Pinto bean plants are maintained in a suitable container and sprayed with 50 ml. of the test formulation in a turntable spray hood. This test formulation contains 0.1 g. chemical (or 0.1 ml. if a liquid), 4.0 ml. acetone, 2.0 ml. stock emulsifier solution (0.5% Triton X–155 in water by volume), and 94.0 ml. distilled water. The concentration of toxicant in this formulation is 1000 parts per million. Lower concentrations of toxicant are obtained by diluting the formulations with distilled water.

After the chemical deposit on the leaves is dry, the paired leaves are separated. One leaf is placed onto 1.5% water agar (15 ml. per 100 mm. polystyrene disposable Petri dish). Ten newly hatched red-banded leaf roller larvae are transferred to the leaf and the Petri dish is covered. These are held at 72° F. for three days when mortality is determined. The feeding inhibition is an indication of the repellent properties of the test chemical. Results of insecticidal activity are given in the following table:

| Compound tested | Concentration, p.p.m. | Percent mortality |
| --- | --- | --- |
| 1-(2,5-dimethylpyrrolidinyl)-thiocarboxanilide | 1,000 | 70, In. |
| 1-(2,5-dimethylpyrrolidinyl)-2'-methyl-carboxanilide | 1,000 | 100, In. |

Note.—In = Greater than 50% feeding inhibition.

EXAMPLE 9

Housefly immersion test

This test determines the insecticidal activity of the compound being tested against houseflies, *Musca domestica.*

The formulation for this test contains 0.4 g. of test compound, 8 ml. acetone, 4 ml. stock emulsifier solution (0.5% Triton X–155 in water by volume) and 187.6 ml. of a ten-percent sugar solution. The concentration of toxicant in this formulation is up to 1000 p.p.m., with lower concentrations being obtained by diluting the formulation with distilled water. The chemical is formulated in a 125-ml. Erlenmeyer flask, adult houseflies (male and female), anesthetized with carbon dioxide, being placed therein and the flask is swirled, wetting the flies with the formulation. The contents of the flask are quickly poured onto a copper wire screen which retains the flies, but permits the formulation to pass through to a beaker where it is available for further testing. The flies are drained a few seconds and then transferred to a 5-oz. Dixie cup containing a disc of 7 cm. Whatman No. 1 filter paper; the cup is immediately covered with a Petri dish lid. The filter paper used is pretreated by soaking it in a 10-percent sucrose solution and drying it and thereby it serves two purposes in the Dixie cup, a source of needed nutrition and absorption of excess formulation from the bodies of the flies. Mortality is determined one day after treatment. Results in insecticidal activity are given in the following table:

| Compound tested | Concentration, p.p.m. | Percent mortality |
| --- | --- | --- |
| 1-(2,5-dimethylpyrrolidinyl)-3'-methyl-carboxanilide | 1,000 | 100 |

EXAMPLE 10

Red spider mite spray plus systemic test

This test determines the insecticidal activity of the compound being tested against the red spider mite, *Tetranychus sp.* A test formulation containing 0.1 g. of the test chemical (or 0.1 ml. if a liquid), 4.0 ml. acetone, 2.0 ml. stock emulsifier solution (0.5% Triton X–155 in water by volume), and 94.0 ml. distilled water is prepared for both the drench and spray treatments. The stock culture of mites is maintained on Scarlet runner bean foliage. Approximately 18 to 24 hours before testing, mites are transferred from the stock culture by pieces of infested leaves which are placed on the primary leaves of two Lima bean plants (var. Sieva) grown in 2½-inch pots. As leaf fragments dry, the mites migrate to the uninfested leaves. Immediately before drenching and spraying, the leaf fragments are removed from the foliage.

In the drench treatment the test formulation is applied to the soil containing the freshly infested plants; 11.2 ml. of the formulation being equivalent to a dosage of the test chemical of 32 pounds per acre. For spray application, 50 ml. of the test formulation (1000 p.p.m.) is sprayed by means of a DeVilbiss paint spray gun (Type CH), calibrated to deliver 45 ml. water in 30 seconds at 30 pounds air pressure per square inch, while the plants are being rotated on a turntable in a hood. After three days, two of the four leaves treated are examined under a binocular stereoscopic microscope and the mortality determined. Using this procedure, the following results are obtained:

| Compound | Dosage Lbs./acre | Dosage P.p.m. | Percent mortality |
| --- | --- | --- | --- |
| 1,4-bis(1-pyrrolidinylcarboxanilide)-benzene | 32 | 1,000 | 68, Ph. |

Note.—Ph = Phytotoxicity exhibited toward bean plant.

EXAMPLE 11

Bean aphid test

This test determines the insecticidal activity of the compound being tested against the bean aphid *Aphis fabae.* A test formulation containing 0.1 g. of the test chemical (or 0.1 ml. if a liquid), 4.0 ml. acetone, 2.0 ml. stock emulsifier solution (0.5% Triton X–155 in water by volume), and 94.0 ml. distilled water is prepared for both the drench and spray treatments. The bean aphid is cultured on nasturtium plants var. Tall Single, no attempt being made to select insects of a given age in these tests. One day before a scheduled evaluation, nasturtiums growing in 2½-inch clay pots are thinned to one plant per pot. These test plants are then infested by excising heavily infested leaves from the colony and hanging these leaves in the crotch of the test plants. As the leaves desiccate overnight, the aphids migrate to the test plants, and populations of 100 to 200 aphids per plant can easily be attained.

Either a combination foliage spray application plus soil drench treatment is used, or just a soil drench application or foliage spray application alone. In the soil drench portion of the combination treatment 11.2 ml. of the test formulation is applied to the freshly infested plants which is equivalent to a dosage of the test chemical of 32 lbs. per acre. Following the drench treatment, the spray application treatment delivers 50 ml. of the test formulation (1000 p.p.m.) by means of a DeVilbiss paint spray gun (Type CH) calibrated to deliver 45 ml. of water in 30 seconds at an air pressure of 30 p.s.i., while the plants are being rotated on a turntable in a hood.

For the soil drench treatment alone, the test formulation is diluted with distilled water and the concentration of emulsifier and solvent is not maintained. The soil drench application delivers a dosage of the test chemical given in the table below as an application of the test chemical in equivalent pounds per acre. For the foliage spray treatment alone, the test formulation is diluted but the concentration of emulsifier and solvent is maintained. The foliage spray application alone of the diluted test formulation delivers 50 ml. of a formulation containing the test chemical in a concentration shown in the table below in parts per million.

After the test plants are treated according to one of these above-described procedures, a set of two Dixie cups is prepared for each test plant; one squat 5-oz. wax coated cup and one squat 7-oz. plastic coated cup. A ⅛-inch strip of paper is cut from each cup from the rim to slightly past the center of the bottom. In use, a 5-oz. cup is placed into a 7-oz. cup, the slits in the cups are aligned, this assembly is slipped around the stem of each infested plant, rested on the pot, and the 5-oz. cup is then rotated 180° in a horizontal plane. The pot-plant-Dixie cup test units are then stood under fluorescent lights in a tray and given bottom watering for the duration of the test. Dead aphids fall into the Dixie cup assemblies where they can easily be counted. Percentage mortality is determined three days after treatment. Using this procedure, the following results are obtained:

| Compound | Dosage Lbs./acre | Dosage P.p.m. | Percent mortality |
|---|---|---|---|
| 1,4-bis(1-pyrrolidinylformamido)-benzene | 32 | 1,000 | 100 |
| 1-pyrrolidinyl-2'-methylcarboxanilide | 32 | 1,000 | 89 |
| 1-pyrrolidinyl-4'-methylcarboxanilide | 32 | 1,000 | 67 |
| 1-pyrrolidinyl-4'-chlorocarboxanilide | 32 | 1,000 | 100 |
| 1-pyrrolidinyl-2'-methoxycarboxanilide | 32 | 1,000 | 98 |
| 1-pyrrolidinyl-4'-methoxycarboxanilide | 32 | 1,000 | 100 |
| 1-(2,5-dimethylpyrrolidinyl)-4'-chlorocarboxanilide | 32 | 1,000 | 100 |
| 1-(2,5-dimethylpyrrolidinyl)-3'-chlorocarboxanilide | 32 | 1,000 | 52 |
| 1-(2,5-dimethylpyrrolidinyl)-4'-methoxycarboxanilide | 32 | 1,000 | 100 |
| 1-(2,5-dimethylpyrrolidinyl)-2'-methoxycarboxanilide | 32 | 1,000 | 100 |
| 1-(2,5-dimethylpyrrolidinyl)-3'-methoxycarboxanilide | 32 | 1,000 | 100 |
| 1-(2,5-dimethylpyrrolidinyl)-4'-nitrocarboxanilide | 32 | 1,000 | 77 |
| 1-(2,5-dimethylpyrrolidinyl)-4'-fluorocarboxanilide | 32 | 1,000 | 100 |
|  | 4 |  | 100 |
| 1-(2,5-dimethylpyrrolidinyl)-3'-trifluoromethylcarboxanilide | 32 | 1,000 | 100 |
|  | 16 | 500 | 100 |
|  |  | 64 | 100 |

EXAMPLE 12

Foliage protectant and eradicant tests

The tomato foliage disease test measures the ability of the test compound to protect tomato foliage against infection by the early blight fungus *Alternaria solani* (Ell. and Mart.) Jones and Grout and the late blight fungus *Phytophthora infestans* (Mont.) de Bary. The method used employs tomato plants, 5 to 7 inches high which are 4 to 6 weeks old. Duplicate plants, one set for each test fungus, are sprayed with various dosages of the test formulation at 40 lbs./sq. in. air pressure while being rotated on a turntable in a hood. The center of the turntable is 45 inches from the nozzle of the spray gun. The test formulation containing the test compound, acetone, stock emulsifier solution and distilled water is applied at concentrations up to 2000 p.p.m. of the test chemical. Lower concentrations of toxicant are obtained by employing less toxicant and more water, thereby maintaining the same concentration of acetone and emulsifier.

After the spray deposit is dry, treated plants and controls (sprayed with formulation less toxicant) are sprayed while being rotated on a turntable with a spore suspension containing approximately 20,000 conidia of *A. solani* per ml., or 150,000 sporangia of *P. infestans* per ml. The atomizer used delivers 20 ml. in the 30-second exposure period. The plants are held in a saturated atmosphere for 24 hours at 70° F. for early blight and 60° F. for late blight to permit spore germination and infection before removal to the greenhouse. After two days from the start of the test for early blight and three days for late blight lesion counts are made on the three uppermost fully expanded leaves. The data are converted to percent disease control based on the number of lesions obtained on the control plants. Dosages and percent disease control are given in the following table:

EARLY BLIGHT

| Compound | Dosage, p.p.m. | Percent disease control |
|---|---|---|
| 1,3-bis(1-pyrrolidinylformamide)-benzene | 1,000 | 90 |
| 1-pyrrolidinyl-3'-chlorocarboxanilide | 1,000 | 100 |
| 1-pyrrolidinyl-3',4'-dichlorocarboxanilide | 1,000 | 83 |
| 1-pyrrolidinyl-2',5'-dichlorocarboxanilide | 1,000 | 92 |
| 1-pyrrolidinyl-4'-methoxycarboxanilide | 1,000 | 88 |
| 1-pyrrolidinyl-3'-methoxycarboxanilide | 1,000 | 84 |
| 1-(2,5-dimethylpyrrolidinyl)-2'-methylcarboxanilide | 1,000 | 98 |
| 1-(2,5-dimethylpyroolidinyl)-thiocarboxanilide | 1,000 | 100 |
| 1-(2,5-dimethylpyrrolidinyl)-4'-nitrocarboxanilide | 1,000 | 98 |

LATE BLIGHT

| Compound | Dosage, p.p.m. | Percent disease control |
|---|---|---|
| 1,3-bis(1-pyrrolidinylformamide)-benzene | 1,000 | 95 |
| 1,4-bis(1-pyrrolidinylformamido)-benzene | 1,000 | 90 |
| 1-pyrrolidinyl-3'-chlorocarboxanilide | 1,000 | 100 |
|  | 256 | 98 |
|  | 32 | 80 |
| 1-pyrrolidinyl-2',5'-dichlorocarboxanilide | 1,000 | 87 |
| 1-(2,5-dimethylpyrrolidinyl)-4'-nitrocarboxanilide | 1,000 | 100 |

EXAMPLE 13

Soil fungicide test

The following test measures the ability of test compounds to protect peas (*Pinum sativum* L. var. Perfection) from damping-off caused by *Fusarium solani* f. *pisi* (Jones) Snyder and Hansen. About 1000 grams of screened, autoclaved soil are used for infestation. The infestation is initiated by mixing about 1000 gms. of soil in plastic bags with 400 gms. of an inoculum which is a cornmeal-and-water (7:6:5) culture of the *F. solani* f. *pisi*. This resulting mixture is then used for infestation of one flat of screened autoclaved soil by thorough incorporation. Treatment of the soil is accomplished by drenching with an appropriate amount of a test formulation containing the test compound, acetone, stock emulsifier solution, and distilled water.

After 25 pea seeds have been placed at a one-half inch depth in the infested soil, the soil drench is carried out with 25 ml. of test formulation which is equivalent to a concentration of active chemical of 48 lbs. per acre. Efficacy of pathogen control is expressed by a qualitative damage rating, evaluated 30 days after the soil drench, as described by the following formula:

$$\frac{\text{Damage}}{\text{rating}} = \frac{(X_1)(N_1) + (X_2)(N_2) + (X_3)(N_3)}{(n)(k)} \times 100$$

$X_1$=severe damage class or necrosis, value=1
$X_2$=moderate damage class value=2
$X_3$=no visible damage class value=3
$N_1 \ldots _2 \ldots _3$=number of representatives per damage class
$n$=number of seeds per treatment
$k=3$ Low summary values indicate high damage and poor control, high summary (maximum 100) indicate low damage and good control. Using this procedure, the following results are obtained:

| Compound tested | Concentration, lbs./acre | Damage rating |
|---|---|---|
| 1-pyrrolidinyl-4'-nitrocarboxanilide | 48 | 60 |
| 1-(2,5-dimethylpyrrolidinyl)-4'-fluorocarboxanilide | 48 | 52 |

EXAMPLE 14

Soil Mycelial inhibition test

The following test measures the ability of compounds to inhibit mycelial growth in soil. One level flat of pasteurized soil is infested with *Rhizoctonia solani*. Another level flat of pasteurized soil is infested with *Selerotium rolfsii*. An addition level flat of pasteurize soil is infected with Pythium sp. Each of the respective infestations is grown on a mixture of corn meal and sand contained in 16-oz. jars. The desired inoculum level for the *R. solani* is achieved by adding a number of jars of the corn meal-sand *R. solani* culture to one level flat of soil. The same procedure is used for the flat containing the *S. rolfsii* as well as for the flat containing the Pythium sp. For each flat, the inoculum and the soil are intimately mixed and thereafter placed in suitable containers. Treatment of the soil in each container is accomplished by drenching an appropriate amount of a diluted formulation containing the test compound, acetone, stock emulsifier solution, and distilled water on the surface of the soil and the test container. For example, 19.9 ml. of a 1000 p.p.m. formulation drenched on soil in a 4-oz. squat Dixie cup is equivalent to a dosage of 48 lbs. per acre.

After drenching, the containers are placed in a high humidity chamber at 70° F. for 48 hours. By this time, each fungus mycelial has completely overgrown the surface of the soil in the control containers. Inhibition of mycelial growth for each of the fungus mycelial is estimated on a scale from 0, complete inhibition of growth, to 10 which is equivalent to controls. These grades are expresed as percent control. Using this procedure, the following results are obtained:

Compound tested: Concentration lbs./acre
   1-pyrrolidinylcarboxanilide -- 48
Percent control:
   R.s. -- 95
   S.r. -- 100
   P.sp. -- 100

EXAMPLE 15

Bean mildew test

This test measures the ability of test chemicals to control bean plants against the powdery mildew *Erysiphe polygoni*. Bean plants, about 4 to 6 inches tall, four per clay pot are treated. Treatment is by soil drench application, or by foliage spray application, or by a combination foliage spray plus soil drench. The test formulation contains 0.1 gm. (0.1 ml. if a liquid) of the test compound, 4.0 ml. acetone, 2.0 ml. stock emulsifier solution, and 94.0 ml. distilled water. Inoculation under greenhouse conditions is provided at least one day prior to treatment by exposure of plants to mildew spores from a culture maintained in the greenhouse. It is not necessary to apply the spores to the plants, but spores are carried by air currents from the culture to the treated plants giving a heavy uniform infection on the controls at the end of the holding period.

For soil drench treatment, in the combined foliage spray plus soil drench application, 17.5 ml. of the test formulation is applied at the soil surface of each pot, which is equivalent to a dosage of test chemical of 64 lbs. per acre on a broadcast basis. In the foliage spray application, 20 ml. of the test formulation containing 2400 parts per million of test chemical are sprayed at 40 lbs. per square inch air pressure while the plants are being rotated on a turntable in a hood. Results are recorded after two weeks by estimating disease control based on the check plants.

For the soil drench treatment alone, the test formulation is diluted with distilled water and the concentration of emulsifier and solvent is not maintained. The soil drench application is equivalent to a dosage of test chemical as given in the table below. Efficacy is reported as percent control, as estimates taken from macroscopic observation at a time 7 days after treatment.

For the spray application treatment alone, the test formulation is diluted with distilled water and the concentration of emulsifier and solvent is not maintained. The spray application is equivalent to a dosage of test chemical as given in the table below. Efficacy is reported as percent control, as estimates taken from macroscopic observation, at a time after treatment which is shown in the table below.

Using these procedures, the following results are obtained:

COMBINATION SOIL DRENCH AND FOLIAGE SPRAY

| Compound tested | Dosage Lbs./acre | P.p.m. | Days after treatment | Percent disease control |
|---|---|---|---|---|
| 1-pyrrolidinyl-2'-ethoxycarboxanilide | 64 | 2,400 | 14 | 95. |
| 1-pyrrolidinyl-4'-chloro-3'-trifluoromethylcarboxanilide | 64 | 2,400 | 14 | 100. |
| 1-(2,5-dimethylpyrrolidinyl)-2',5'-dichlorocarboxanilide | 64 | 2,400 | 14 | 95. |
| 1-(2,5-dimethylpyrrolidinyl)-3'-methoxycarboxanilide | 64 | 2,400 | 14 | 98. |
| 1-(2,5-dimethylpyrrolidinyl)-3'-trifluoromethylcarboxanilide | 64 | 2,400 | 14 | 95. |

SOIL DRENCH ALONE

| Compound tested | Dosage Lbs./acre | P.p.m. | Days after treatment | Percent disease control |
|---|---|---|---|---|
| 1-(2,5-dimethylpyrrolidinyl)-3'-methoxycarboxanilide | 64 | | 7 | 100, Ph7. |
| 1-(2,5-dimethylpyrrolidinyl)-3'-trifluoromethylcarboxanilide | 64 | | 7 | 80, Ph4. |
| 1-pyrrolidinyl-4'-chlorocarboxanilide | 16 | | 7 | 100, Ph11. |
| 1-(2,5-dimethylpyrrolidinyl)-4'-methoxycarboxanilide | 16 | | 7 | 95. |
| | 8 | | 7 | 80, Ch, Ph5. |
| | 4 | | 7 | 60, Ch, Ph4. |

FOLIAGE SPRAY ALONE

| Compound tested | Dosage Lbs./acre | P.p.m. | Days after treatment | Percent disease control |
|---|---|---|---|---|
| 1-pyrrolidinyl-2'-ethoxycarboxanilide | | 1,200 | 6 | 100. |
| 1-pyrrolidinyl-4'-chlorocarboxanilide | | 1,200 | 7 | 50. |
| 1-pyrrolidinyl-2'-methoxycarboxanilide | | 1,200 | 7 | 100. |
| | | 300 | 9 | 50. |
| 1-pyrrolidinyl-4'-methoxycarboxanilide | | 1,200 | 7 | 100. |
| 1-(2,5-dimethylpyrrolidinyl)-2'-methylcarboxanilide | | 1,200 | 7 | 98. |
| | | 600 | 7 | 98, Ch, Ph2. |
| 1-pyrrolidinyl-4'-chloro-3'-trifluoromethylcarboxanilide | | 1,200 | 9 | 99. |
| | | 600 | 9 | 98. |
| | | | 14 | 95, Nc. |
| | | 300 | 14 | 60, Nc. |
| 1-(2,5-dimethylpyrrolidinyl)-4'-chlorocarboxanilide | | 300 | 7 | 98. |
| 1-(2,5-dimethylpyrrolidinyl)-3'-chlorocarboxanilide | | 300 | 7 | 98. |
| 1-(2,5-dimethylpyrrolidinyl)-2',5'-dichlorocarboxanilide | | 600 | 7 | 100, Ph5, St7. |
| | | | 13 | 100, Ph10, St7. |
| 1-(2,5-dimethylpyrrolidinyl)-3'-methoxycarboxanilide | | 300 | 7 | 100, Ph8. |
| | | 150 | 7 | 90, Ch, Ph5. |
| | | 75 | 7 | 80, Ch, Ph5. |
| 1-(2,5-dimethylpyrrolidinyl)-3'-trifluoromethylcarboxanilide | | 300 | 7 | 100, Ph5. |
| | | 150 | 7 | 80, Ph5. |

NOTE.—Ph=Phytotoxicity, from 1 slight to 11 severe. Nc=Necrosis. St=Stunting, from 1 slight to 9 severe. Ch=Chlorosis.

EXAMPLE 16

Systemic bean rust (I)

Pinto bean plants at a growth stage when the trifoliate leaves are just beginning to emerge from the axis of the seed leaves are used as the test species. These plants are grown in 4-inch pots and thinned to three plants per pot. Usually the plants are about 10 to 14 days old from time of planting. There are, therefore, six primary seed leaves per pot for each test unit. In the test, an appropriate amount of the test formulation is drenched on each pot. A dosage of 56 ml. of the test formulation is equivalent to 56 mg. of chemical or 64 pounds per acre. This test formulation contains the test compound, acetone, stock emulsifier solution and distilled water. The concentration of toxicant in this formulation is up to 2000 parts per million. Lower concentrations of toxicant are obtained by diluting the formulation with distilled water.

About two or three hours after treatment the plants are exposed to a spore suspension of bean rust from a culture maintained in the greenhouse. The rust spore suspension contains 40 mg. spores in 300 ml. of 0.01 percent Tween 20. It is not necessary to apply the spores to the plants, but spores are carried by air currents from the culture to the treated plants giving heavy uniform infection on the controls at the end of the holding period. After exposure, the plants are immediately placed in a moist chamber in a saturated atmosphere at 60° F., for 24 hours after which they are removed to the greenhouse. Counts are made about 10 days after spore exposure and the mean number of rust pustules per leaf is determined. These counts are calculated against the check counts to arrive at the percentage disease control. Using this procedure, the following results are obtained:

| Compound tested | Concentration, lbs./acre | Percent disease control |
|---|---|---|
| 1,3-bis(1-pyrrolidinylformamido) benzene | 64 / 32 | 94, Ph4, Ch. / 91. |
| 1-pyrrolidinyl-4'-nitrocarboxanilide | 64 / 16 | 100, Ph3. / 97. |
| 1-pyrrolidinyl-2'-ethoxycarboxanilide | 64 | 100. |
| 1-pyrrolidinyl-4'-chlorocarboxanilide | 16 / 8 | 100, Ph11. / 90. |
| 1-pyrrolidinyl-3'-trifluoromethylcarboxanilide. | 8 / 2 | 100, Ph11. / 100. |
| 1-pyrrolidinyl-3'-methylcarboxanilide | 8 / 4 | 100, St3, Ph3. / 99, Ph2. |
| 1-pyrrolidinyl-2'-methoxycarboxanilide | 65 / 16 | 100. / 90, Ph2. |
| 1-pyrrolidinyl-4'-methoxycarboxanilide | 16 | 99, Ph4, St3. |

NOTE.—Ch=Chlorosis. St=Stunting, from 1 slight to 9 severe. Ph=Phytotoxicity, from 1 slight to 11 severe.

EXAMPLE 17

Systemic bean rust (II)

This test determines the effective capacity of test chemicals as systemic bean rusticides. The host-rust system employed is *Uromyces phaseoli* on beans (*Phaseolus vulgaris*) var. Pinto which are tested in four-inch clay pots. The basic test formulation used contains 0.1 g. (or 0.1 ml. if a liquid) of the test chemical, 4.0 ml. acetone, 2.0 ml. stock emulsifier solution, and 94.0 ml. distilled water. A drenching with 45 ml. of this basic test formulation is equivalent to a dosage of the test chemical of 64 lbs. per acre. To obtain the lower dosages used, which are reported in the table below in equivalent pounds per acre of test chemical, the basic test formulation is diluted with distilled water.

Twenty-four hours after application of the test chemical, bean plants are inoculated by atomizing onto the plant leaves a single aqueous suspension containing the uredospore specie, and subsequently the plants are kept for an overnight incubation period at 60° F. and 100 percent relative humidity. Pustule counts are made 7 to 10 days after inoculation and effective control is reported as percent disease control based upon pustule development in nontreated control plants. Additionally, phytotoxicity of the plants by the test chemical is rated by visual observation on a scale from 0, indicating no plant injury, to 11, indicating plant kill. Using this procedure, the following results are obtained:

| Compound tested | Concentration, lbs./acre | Percent disease control |
|---|---|---|
| 1-(2,5-dimethylpyrrolidinyl)-4'-fluorocarboxanilide. | 8 / 2 / 1 | 100, Ph10. / 100, Ph10. / 100, Ph10. |
| 1-(2,5-dimethylpyrrolidinyl)carboxanilide | 1 | 100, Ph8. |
| 1-pyrrolidinyl-3'-trifluoromethylcarboxanilide. | 4 / 2 | 100, Ph8. / 92, Ph7. |
| 1-pyrrolidinyl-3'-methoxycarboxanilide | 8 / 4 | 100, Ph8. / 85, Ph1. |
| 1-(2,5-dimethylpyrrolidinyl)-3'-methylcarboxanilide. | 1 | 100, Ph10. |
| 1-(2,5-dimethylpyrrolidinyl)-4'-chlorocarboxanilide. | 2 / 1 | 100, Ph7. / 50, Ph4. |
| 1-(2,5-dimethylpyrrolidinyl)-2'-methoxycarboxanilide. | 8 | 75, Ph8. |
| 1-(2,5-dimethylpyrrolidinyl)-3'-methoxycarboxanilide. | 2 / 1 | 100, Ph7. / 72, Ph5. |
| 1-(2,5-dimethylpyrrolidinyl)-2'-methylcarboxanilide. | 8 | 99, Ph9. |
| 1-(2,5-dimethylpyrrolidinyl)-thiocarboxanilide. | 8 | 100, Ph9. |
| 1-(2,5-dimethylpyrrolidinyl)-4'-cyanocarboxanilide. | 4 / 2 / 1 | 100, Ph10. / 100, Ph8. / 89, Ph6. |
| 1-(2,5-dimethylpyrrolidinyl)-4'-nitrocarboxanilide. | 32 / 16 | 85. / 50. |

NOTE.—Ph=Phytotoxicity.

EXAMPLE 18

Systemic bean rust (III)

This test determines the effective capacity of test chemicals as systemic bean rusticides. Pinto bean plants at a growth stage when the trifoliate leaves are just beginning to emerge from the axis of the seed leaves are used as the test species. These plants are grown in 4-inch pots and thinned to three plants per pot. Usually the plants are about 10 to 14 days old from time of planting. There are, therefore, 6 primary seed leaves per pot for each test unit.

In the test, an appropriate amount of the test formulation is either drenched on each pot or is sprayed on the foliage of the plants. In the soil drench treatment a dosage of 56 mls. of the test formulation is equivalent to 56 mgs. of chemical or 64 lbs. per acre. Lower concentrations of toxicant for the soil drench are obtained by diluting the formulation with distilled water. The less concentrated dosages of test chemical applied in the soil drench are given in the table below as applications of the test chemical in equivalent pounds per acre.

For the foliage spray application the concentration of toxicant in the test formulation is 100 p.p.m. This concentration of toxicant is obtained by employing less toxicant and more water in the basic test formulation, thereby maintaining the same concentration of acetone and emulsifier. The basic test formulation contains the test compound, acetone, stock emulsifier solution, and distilled water.

The bean plants are inoculated by atomizing onto the plant leaves a single aqueous suspension containing the uredospore specie, and subsequently the plants are kept for an overnight incubation period at 60° F. in 100 percent relative humidity. The time span between the treatment of the plants and the time of the plant inoculation is given in the table below. Pustule counts are made ten days after inoculation and effective control is reported as percent disease control based upon the pustule development in non-treated control plants. Additionally, phytotoxicity of the plants by the test chemical is rated by visual observation on a scale from 0, indicating no plant injury, to 11, indicating plant kill. Using this procedure, the following results are obtained:

| Compound tested | Dosage Foliage spray, p.p.m. | Dosage Soil drench, lbs./acre | Delay, in hours, after inoculation before treatment | Percent disease control |
|---|---|---|---|---|
| 1-pyrrolidinyl-3'-chlorocarboxanilide. | | 8 | 24 | 100. |
| | | 8 | 48 | 100. |
| | | 4 | (*) | 100, Ph2, St4. |
| | | 2 | (*) | 100, Ph1. |
| | 100 | | (*) | 98. |
| | 100 | | 24 | 98. |

*=Plants treated 2-3 hours or less before inoculation.
NOTE.—Ph=Phytotoxicity. St=Stunting, from 1 slight to 9 severe.

EXAMPLE 19

Bactericide test against four species

Test formulations are examined for ability to inhibit the colonial growth of *Erwinia amylovora* (E.a.), *Xanthomonas phascoli* (X.p.), *Staphylococcus aureus* (S.a.), and *Escherechia coli* (E.c.) at various concentrations. The basic test formulation contains 0.1 g. of the test chemical, 4 ml. acetone, 2 ml. stock emulsifier solution (0.5% Triton X–155 in water by volume) and 74 ml. distilled water, the concentration of toxicant in this formulation being 1250 parts per million.

Two ml. of each formulation is dispensed into a test tube which is then placed into a water bath maintained at 44° C. From a stock preparation (also held at 44° C.), 8 ml. of 20-percent nutrient agar is added to the test tube giving a 1:5 dilution or a final concentration of 250 p.p.m. chemical in the agar. For lower concentrations of chemical, the basic test formulation is diluted with distilled water prior to combining with the stock preparation of nutrient agar. The contents of the test tube are then thoroughly mixed, while still warm, with the aid of a Vortex type mixer and immediately poured into a sterile polystyrene petri dish (100 x 15 mm.). After the agar in the plate has set, suspensions of each organism are simultaneously streaked onto the surface of the agar. After the plate is inoculated, it is incubated 24 to 48 hours at 30° C., after which time growth of each organism is noted. Estimates of percent growth inhibition given in the table below, are relative to growth of streak colonies in control plates obtained during individual tests.

| Compound | Concentration, p.p.m. | Percent growth inhibition | | | |
|---|---|---|---|---|---|
| | | E.a. | X.p. | S.a. | E.c. |
| 1-pyrrolidinyl-3'-nitrocarboxanilide. | 250 | 100 | 100 | 100 | 100 |
| 1-pyrrolidinyl-4'-chloro-3'-trifluoromethylcarboxanilide. | 250 | 100 | –0– | 100 | –0– |
| 1-(2,5-dimethylpyrrolidinyl)-3',4'-dichlorocarboxanilide. | 250 | 100 | | | –0– |
| | 128 | | 50 | 100 | –0– |
| 1-(2,5-dimethylpyrrolidinyl)-thiocarboxanilide. | 250 | –0– | 50 | 50 | –0– |
| 1,3-bis(1-pyrrolidinyl-formamido) benzene. | 250 | –0– | 100 | –0– | –0– |
| 1-pyrrolidinylcarboxanilide | 250 | –0– | 100 | –0– | –0– |

EXAMPLE 20

Systemic bactericidal test

Part 1.—Systemic bactericidal activity is determined by the ability of the test chemical to control tomato crown gall from *Agrobacterium tumefaciens*. Either a combination foliage spray application plus soil drench treatment is used, or just a soil drench application. Individual tomato plants var. Rutgers are used for both tests and are planted in 3½-inch clay pots for the combined foliage spray and soil drench test, and in 2½-inch clay pots for the soil drench treatment alone. Inoculation of the plants is by stem puncture at the cotyledonary node with a cellular suspension of the *Agrobacterium tumefaciens*, and is made at least 2 hours prior to the soil drench treatment alone, and 1 to 2 hours prior to the combination foliage spray and soil drench application. The test formulation contains 0.1 g. (or 0.1 ml. if a liquid) of the test compound, 4.0 ml. acetone, 2.0 ml. stock emulsifier solution, and 94.0 ml. distilled water.

For soil drench treatment, in the combined foliage spray plus soil drench application, 17.5 ml. of the test formulation is applied at the soil surface of each pot, which is equivalent to a dosage of test chemical of 64 lbs. per acre on a broacast basis. In the foliage spray application, 20 ml. of the test formulation containing 2400 parts per million of test chemical are sprayed at 40 lbs. per square inch air pressure while the plants are being rotated on a turntable in a hood. Control for this combination treatment is determined through visual observation of tumor formation 10 to 14 days after treatment with a rating of 90 percent being given to an estimate of complete control.

For the soil drench treatment alone, the test formulation is diluted with distilled water and the concentration of emulsifier and solvent is not maintained. The soil drench application is equivalent to a dosage of test chemical as given in the table below. Control is determined through visual observation of tumor formation 10 days after treatment and complete control is rated at 100 percent.

COMBINATION SOIL DRENCH AND FOLIAGE SPRAY TREATMENT

| Compound tested | Dosage | | Percent disease control |
|---|---|---|---|
| | Soil drench, lbs./acre | Foliage spray, p.p.m. | |
| 1-pyrrolidinyl-2',5'-dichlorocarboxanilide | 64 | 2400 | 90. |
| 1-pyrrolidinyl-3'-nitrocarboxanilide | 64 | 2400 | 90. |
| 1-pyrrolidinyl-4'-chloro-3'-trifluoromethylcarboxanilide. | 64 | 2400 | 90. |

SOIL DRENCH ALONE

| | | |
|---|---|---|
| 1-pyrrolidinyl-3'-trifluoromethylcarboxanilide. | 8 | 90. |
| 1-pyrrolidinyl-4'-chlorocarboxanilide | 8 | 90. |
| 1-pyrrolidinyl-2'-methylcarboxanilide | 32 | 100. |
| 1-pyrrolidinyl-2',5'-dichlorocarboxanilide | 32 | 90, St6. |
| 1-pyrrolidinyl-3'-nitrocarboxanilide | 16 | 90. |
| 1-pyrrolidinyl-4'-chloro-3'-trifluoromethylcarboxanilide. | 32 | 90. |
| 1-(2,5-dimethylpyrrolidinyl)-2'-ethoxycarboxanilide. | 32 | 90. |

Note.—St=Stunting, from 1 slight to 9 severe.

Part 2.—Additionally, a subsequent soil drench treatment was performed, using distilled water diluted test formulations yielding an application strength equivalent to a dosage of the test chemical of 8 lbs. per acre. At least 2 hours prior to the soil drench treatment primary inoculation by stem puncture is performed at the cotyledonary node. Ten days following primary inoculation, secondary inoculations are made at the first true leaf node. Percent control, expressed as percent reduction in tumor size as compared with non-treated check plants, is made by visual observation 2 days after the secondary inoculation and the following results are obtained:

SUBSEQUENT SOIL DRENCH

| Compound tested | Percent disease control |
|---|---|
| 1-pyrrolidinyl-4'-chlorocarboxanilide | 70 |
| 1-pyrrolidinyl-3'-trifluoromethylcarboxanilide | 60 |

EXAMPLE 21

Bean and corn viricide tests

Test formulations are examined for ability to control either or both of two host virus systems, southern bean mosaic (B.V.) on Pinto bean and maize dwarf mosaic virus (C.V.) on Golden Bantam sweet corn. A test formulation containing 0.1 g. of the test chemical, 4.0 ml. acetone, 2.0 ml. stock emulsifier solution (0.5% Triton X–155 in water by volume), and 94.0 ml. distilled water is prepared for a combination soil drench and foliage spray treatment, or just a soil drench application, or just a foliage spray application.

In the combination treatment, the foliage spray application is carried out with 33 ml. of the test formulation (1000 p.p.m.) sprayed at 40 pounds per square inch air pressure while the plants are being rotated on a turntable in a hood. Twenty-four hours after spraying, the soil drench treatment is carried out by applying the test formulation at the soil surface of each pot, with 45 ml. of the formulation being equivalent to a dosage of the test chemical of 64 pounds per acre.

For the combination treatment both host virus systems, southern bean mosaic on *Phaseolus vulgaris* var. Pinto and maize dwarf mosaic virus on *Zea Mays* var. Golden X Bantam, are cultured in the same four-inch clay pot. For the soil drench alone and foliage spray alone, single host-virus systems are cultured in the clay pots. All virus inoculation is made by carborundum leaf abrasion method prior to treatment.

For the soil drench treatment alone, the test formulation is diluted with distilled water and the concentration of emulsifier and solvent is not maintained. As shown in the table below, the soil drench application is equivalent to a dosage of test chemical on a basis of pounds of test chemical applied per acre.

For the spray application alone, the concentration of toxicant, reported in the table below as parts per million of toxicant in the spray formulation, is obtained by supplying less toxicant and more water in the basic test formulation, thereby maintaining the same concentration of acetone and emulsifier. The application procedure used is the same as described above.

Effective control in all tests is determined through visual observation of the presence or absence of viral infection symptoms 10 days after inoculation. Using this procedure, the following results are obtained:

| Compound | Dosage Soil drench, lbs./acre | Dosage Foliage spray, p.p.m. | Percent control C.V. | Percent control B.V. |
|---|---|---|---|---|
| 1-pyrrolidinyl-3'-methoxycarboxanilide. | 64 | 1,000 | 100 | Ph 1. |
|  | 32 |  | 100, Ph 3 | 100, Ph 4. |
|  | 16 |  |  | 100, Ph 9. |
| 1-(2,5-dimethylpyrrolidinyl)-2'-methylcarboxanilide. | 64 | 1,000 | -0- | 100. |
|  | 16 |  |  | 100, Ph 9. |
| 1-(2,5-dimethylpyrrolidinyl)-thiocarboxanilide. | 64 | 1,000 | -0- | 100. |
|  | 16 |  |  | 100, Ph 9. |
| 1-(2,5-dimethylpyrrolidinyl)-4'-cyanocarboxanilide. | 64 | 1,000 | 100 | Ph 11. |
|  |  | 500 |  | 100, Ph 9. |
| 1-(2,5-dimethylpyrrolidinyl)-2'-ethoxycarboxanilide. | 64 | 1,000 | 100 | Ph 11. |
| 1(2,5-dimethylpyrrolidinyl)-3'-trifluoromethyl thiocarboxanilide. | 64 | 1,000 | 100 |  |
| 1-(2,5-dimethylpyrrolidinyl)-4'-bromocarboxanilide. |  | 32 |  | 100, Ph 9. |
| 1-(2,5-dimethylpyrrolidinyl)-3'-nitrocarboxanilide. |  | 32 |  | 100, Ph 11, Fe. |
|  |  | 16 |  | 100, Ph 11, Fe. |
|  |  | 8 |  | 100, Ph 8, Fe. |
| 1-pyrrolidinyl-3'-methylcarboxanilide. |  | 8 | 100 |  |
| 1-(2,5-dimethylpyrrolidinyl)carboxanilide. |  | 500 | 100, Ph 9 | 100, Ph 10. |

Note.—Ph=Phytotoxicity from 1 slight to 11 severe. Fe=Formative effects.

EXAMPLE 22

Root-knot nematode test

This test is an evaluation of the effectiveness of the compounds of this invention against root-knot nematodes (Meloidogyne spp.).

Composted greenhouse soil, diluted by one-third with clean washed sand, is placed in 4-inch clay pots and infested with one to three grams of knotted or galled tomato roots. The test formulation contains 0.1 g. of the test chemical (or 0.1 ml. if a liquid), 4.0 ml. acetone, 2.0 ml. stock emulsifier solution (0.5% Triton X-155 in water by volume) Treatment is accomplished by applying 2.5 ml. of the test formulation (equivalent to a dosage of 128 pounds per acre) onto the infested soil. Lower concentration of toxicant are obtained by diluting the test formulation with distilled water.

After treament, the soil, inoculum, and chemical are thoroughly mixed in an 8-pound paper bag, returned to the pot, and the mixture incubated for seven days at 20° C. and constant moisture. After incubation, two seedling Rutgers tomato transplants and three Windsor bean (Vicia faba) seeds are set in each pot. Roots are removed from the soil after three weeks of growth and rated for gall (root-knot nematode infection) formation. Windsor bean roots are evaluated only when necrosis of the tomato host has occurred. A rating of infection from 0 to 10 is recorded: 0-no galls or complete control and 10-heavily galled roots comparable to controls. Each of the root systems is rated separately and the average is multiplied by 10 and substracted from 100 to give percent nematode control. Results of the test are as follows:

| Compound | Concentration, lbs./acre | Percent control root-knot nematodes |
|---|---|---|
| 1,3-bis(1-pyrrolidinylformamido) benzene | 128 | 100 |
| 1-pyrrolidinyl-3',4'-dichlorocarboxanilide | 128 | 100 |
| 1-pyrrolidinyl-2'-methylcarboxanilide | 64 | 100 |
| 1-pyrrolidinyl-4'-chlorocarboxanilide | 64 | 100 |
| 1-pyrrolidinyl-2'-methoxycarboxanilide | 32 | 90 |

EXAMPLE 23

Panagrellus test

Nonplant parasitic nematodes (Panagrellus redivivus) are exposed to the test chemical in small watch glasses. Two watch glasses receive dosages of a test formulation containing the test compound, acetone, stock emulsifier solution and distilled water. After the test dishes have been set up, the Panagrellus suspension is added to each watch glass. After these additions are made, the Petri dishes are closed; the watch glasses thus measure contact activity.

The organism is grown on cooked oatmeal which is sterilized in the autoclave before being centrally inoculated from an old culture. The culture is held at 22° C. after 10 to 14 days the surface of the oatmeal is swarming with nematodes which are visible to the eye. Such a culture is used to prepare the test suspension. The concentration of the nematodes is adjusted so that each watch glass contains 30 to 40 nematodes. At the end of 48 hours mortality counts are made from which percent kill can be determined. Using this procedure, the following results are obtained:

| Compound | Concentration, p.p.m. | Percent mortality |
|---|---|---|
| 1-pyrrolidinylcarboxanilide | 100 | 100 |
| 1,3-bis(1-pyrrolidinylformamido) benzene | 100 | 50 |

We claim:
1. Method of killing and controlling fungus on plants which comprises applying to said fungus a fungicidally effective amount of 1-pyrrolidinyl-3'-chlorocarboxanilide.

References Cited

Beaver et al., 1957, Journal of American Chemical Society, vol. 79, pp. 1236–1245.

Brown et al., Journal of the American Chemical Society, 1955, vol. 77, No. 5, pp. 1079–1097.

STANLEY J. FRIEDMAN, Primary Examiner

D. R. ORE, Assistant Examiner

U.S. Cl. X.R.

71—95; 260—326.3, 326.83

UNITED STATES PATENT OFFICE
CERTIFICATE OF CORRECTION

Patent No. 3,639,608  Dated February 1, 1972

Inventor(s) Bobby F. Adams, William J. Pyne and James M. Gullo

It is certified that error appears in the above-identified patent and that said Letters Patent are hereby corrected as shown below:

Columns 5 and 6, Table 1, 4th entry under heading "Product", change "1-(2,5-dimethylpyrrolodinyl)-4'-methoxycarboxanilide" to --1-(2,5-dimethylpyrrolidinyl)-4'-methoxycarboxanilide--; Columns 5 and 6, Table 1, 5th entry under heading "Product", change "1-(2,5-dimethylpyrrolidinyl)2'-methoxycarboxanilide" to --1-(2,5-dimethylpyrrolidinyl)-2'-methoxycarboxanilide--; Columns 5 and 6, Table 1, 10th entry under heading "Product", change "1-(2-5,dimethylpyrrolidinyl)-2'-methylcarboxanilide" to --1-(2,5-dimethylpyrrolidinyl)-2'-methylcarboxanilide--; Columns 5 and 6, Table 1, 13th entry under heading "Empirical formula", change "$C_{13}H_{17}P_1N_2O$" to --$C_{13}H_{17}F_1N_2O$--; Columns 5 and 6, Table 1, 14th entry under heading "Empirical formula", change "$C_{14}H_{17}P_3N_2S$" to --$C_{14}H_{17}F_3N_2S$--; Columns 5 and 6, Table 1, 17th entry under heading "Empirical formula", change "$C_{14}H_{17}P_3N_2O$" to --$C_{14}H_{17}F_3N_2O$--; Columns 5 and 6, Table 1, 18th entry under heading "Empirical formula", change "$C_{14}H_{17}Cl_1N_2O$" to --$C_{13}H_{17}Cl_1N_2O$--; Columns 5 and 6, Table 1, 19th entry under heading "Product", change "1-((2,5-dimethylpyrrolidinyl)-3'-nitrocarboxanilide" to --1-(2,5-dimethylpyrrolidinyl)-3'-nitrocarboxanilide--; Columns 5 and 6, Table 1, 20th entry under heading "Product", change "1-(2,5-dimethylpyrrolidinyl)-3,4-dichlorocarboxanalide" to --1-(2,5-dimethylpyrrolidinyl)-3,4-dichlorocarboxanilide--; Columns 7 and 8, Table 2 - Part 1, after the 6th entry, before the last two columns of numbers, insert the heading entitled --Nitrogen Analysis--; Columns 7 and 8, Table 2 - Part 1, 13th entry under heading "Product", change "1-pyrrolidinyl-2'-methoxyxarboxanilide" to --1-pyrrolidinyl-2'-methoxycarboxanilide--; Columns 7 and 8, Table 2 - Part 1, 14th entry under heading "Product", change "1-pyrrolidinyl4'-methoxycarboxanilide" to --1-pyrrolidinyl-4'-methoxycarboxanilide--; Columns 7 and 8, Table 2 - Part 1, 18th entry under heading "Product", change "1-pyrrolidinyl-2'4'-dimethylcarboxanilide" to --1-pyrrolidinyl-2',4'-dimethylcarboxanilide--;

(continued)

UNITED STATES PATENT OFFICE
CERTIFICATE OF CORRECTION

Patent No. 3,639,608      Dated February 1, 1972

Inventor(s) Bobby F. Adams, William J. Pyne and James M. Gullo

It is certified that error appears in the above-identified patent and that said Letters Patent are hereby corrected as shown below:

Columns 7 and 8, Table 2 - Part 2, 1st entry under heading "Product", change "1,3-bis(1'-pyrrolidinylformamide)-benzene" to --1,3-bis(1'-pyrrolidinylformamido)-benzene--; Columns 7 and 8, Table 2 - Part 2, 2nd entry under heading "Product", change "1,4-bis(1'-pyrrolidinylformamide)-benzene" to --1,4-bis(1'-pyrrolidinylformamido)-benzene--; Columns 9 and 10, Table 4, 5th entry under heading "Empirical formula", change "$C_{13}H_{17}P_1H_2O$" to --$C_{13}H_{17}F_1N_2O$--; Column 10, line 25, change "5-n-propylpyrrolidinyl)[carboxanilide" to --5-n-propylpyrrolidinyl)]carboxanilide--; Column 11, line 8, after the word "mole", insert --)--; Column 11, line 8, delete "," at end of line and insert --.--; Columns 11 and 12, Table 5, 4th entry under heading "Empirical formula", change "$C_{19}H_{29}Cl_2N_2O$" to --$C_{19}H_{28}Cl_2N_2O$--; Columns 11 and 12, Table 5, 5th entry under heading "Product", change "1-[1-(2,2-dimethyl-4-isopropyl-5-n-propylpyrrolidinyl)]-2'-ethylcarboxanilide" to --1-[1-(2,2-dimethyl-4-isopropyl-5-n-propylpyrrolidinyl)]-2'-methylcarboxanilide--; Column 11, line 60, change "randomyl" to --randomly--; Column 11, line 61, change "petri" to --Petri--; Column 12, line 23, change "petri" to --Petri--; Column 12, lines 45-50, 2nd entry under heading "Compound tested", change "1-(2,5-dimethylpyrrolidinyl)-2'-mothylcarboxanilide" to --1-(2,5-dimethylpyrrolidinyl)-2'-methylcarboxanilide--; Column 12, line 61, change "Argyrotacnia volutiana" to --Argyrotaenia velutinana--; Column 15, between lines 60-65, 8th entry under heading "Compound", change "1-(2,5-dimethylpyroolidinyl)-thiocarboxanilide" to --1-(2,5-dimethylpyrrolidinyl)-thiocarboxanilide--; Column 16, line 5, change "Pinum" to --Pisum--; Column 16, line 11, change "cornmeal-and-water" to --cornmeal-sand-water--; Column 16, line 54, change "Selerotium" to --Sclerotium--; Column 16, line 55, change "pasteurize" to --pasteurized--; Column 19, between lines 10-15, 12th entry under heading "Concentration, lbs./acre", (continued)

Page 2

UNITED STATES PATENT OFFICE
CERTIFICATE OF CORRECTION

Patent No. 3,639,608          Dated February 1, 1972

Inventor(s) Bobby F. Adams, William J. Pyne and James M. Gullo

It is certified that error appears in the above-identified patent and that said Letters Patent are hereby corrected as shown below:

change "65" to --64--; Column 20, line 54, change "phascoli" to --phaseoli--; Column 21, line 41, change "broacast" to --broadcast--; Column 23, line 43, after "volume)" insert --.--; Column 23, line 44, change "2.5" to --25--; Column 23, line 46, change "concentration" to --concentrations--; Column 23, line 58, change "0-no" to --0 = no--; Column 23, line 58, change "10-heavily" to --10 = heavily--; Column 24, last paragraph before Claim 1 should read --It is to be understood that, although the invention has been described with specific reference to particular embodiments thereof, it is not to be so limited, since changes and alterations therein may be made which are within the full intended scope of this invention as defined by the appended claims.--.

Signed and sealed this 21st day of November 1972.

(SEAL)
Attest:

EDWARD M. FLETCHER, JR.
Attesting Officer

ROBERT GOTTSCHALK
Commissioner of Patents